(12) United States Patent
Jones

(10) Patent No.: US 9,372,941 B2
(45) Date of Patent: *Jun. 21, 2016

(54) DATA PROCESSING APPARATUS AND METHOD OF PROCESSING DATA

(75) Inventor: Kevin Lloyd Jones, Bristol (GB)

(73) Assignee: Hewlett Packard Enterprise Development LP, Houston, TX (US)

(*) Notice: Subject to any disclaimer, the term of this patent is extended or adjusted under 35 U.S.C. 154(b) by 1579 days.

This patent is subject to a terminal disclaimer.

(21) Appl. No.: 12/671,322

(22) PCT Filed: Oct. 25, 2007

(86) PCT No.: PCT/US2007/022629
§ 371 (c)(1),
(2), (4) Date: Jan. 29, 2010

(87) PCT Pub. No.: WO2009/054834
PCT Pub. Date: Apr. 30, 2009

(65) Prior Publication Data
US 2010/0198832 A1    Aug. 5, 2010

(51) Int. Cl.
*G06F 17/30* (2006.01)
*G06F 11/14* (2006.01)

(52) U.S. Cl.
CPC ...... *G06F 17/30982* (2013.01); *G06F 11/1451* (2013.01)

(58) Field of Classification Search
None
See application file for complete search history.

(56) References Cited

U.S. PATENT DOCUMENTS

| | | |
|---|---|---|
| 5,369,778 A | 11/1994 | San Soucie |
| 5,638,509 A | 6/1997 | Dunphy |
| 5,990,810 A | 11/1999 | Williams |
| 6,003,114 A | 12/1999 | Bachmat |
| 6,122,626 A | 9/2000 | Brandsma |
| 6,396,838 B1 | 5/2002 | Palnati |
| 6,513,050 B1 | 1/2003 | Williams |
| 6,542,975 B1 | 4/2003 | Evers |
| 6,564,228 B1 | 5/2003 | O'Connor |
| 6,785,768 B2 | 8/2004 | Peters et al. |
| 6,795,963 B1 | 9/2004 | Andersen |

(Continued)

FOREIGN PATENT DOCUMENTS

| | | |
|---|---|---|
| CN | 1692356 | 11/2005 |
| EP | 2038763 | 1/2008 |

(Continued)

OTHER PUBLICATIONS

Fenstermacher et al.; "Mining Client-Side Activity for Personalization" Department of Management Information Systems, Eller College of Business and Public Administration, University of Arizona, Jun. 2002 (8 pages).

(Continued)

*Primary Examiner* — Alicia Willoughby
(74) *Attorney, Agent, or Firm* — Forresters

(57) ABSTRACT

Data processing apparatus comprising: a chunk store configured for containing specimen data chunks, a discrete manifest store, configured for containing at least one manifest that represents at least a part of a data set and that comprises at least one reference to at least one of said specimen data chunks, the processing apparatus being operable to process input data into input data chunks and to identify at least one manifest in the manifest store that includes at least one said reference to a said specimen data chunk corresponding to at least one of said input data chunks.

2 Claims, 7 Drawing Sheets

(56) References Cited

U.S. PATENT DOCUMENTS

| | | |
|---|---|---|
| 6,839,680 B1 | 1/2005 | Liu |
| 6,938,005 B2 | 8/2005 | Iverson |
| 6,961,009 B2 | 11/2005 | McCanne |
| 7,028,158 B1 | 4/2006 | Beatty et al. |
| 7,082,548 B2 | 7/2006 | Nakano |
| 7,269,689 B2 | 9/2007 | Eshghi |
| 7,472,242 B1 | 12/2008 | Deshmukh |
| 7,577,817 B2 | 8/2009 | Karpoff et al. |
| 7,584,338 B1 | 9/2009 | Bricker et al. |
| 7,593,973 B2 | 9/2009 | Lee |
| 7,636,827 B2 | 12/2009 | Asano et al. |
| 7,660,836 B2 | 2/2010 | Bolik et al. |
| 7,733,247 B1 | 6/2010 | He et al. |
| 7,761,680 B2 | 7/2010 | Ash et al. |
| 7,788,233 B1 | 8/2010 | Iyer et al. |
| 7,913,056 B2 | 3/2011 | Brown et al. |
| 7,917,722 B2 | 3/2011 | Yamamoto et al. |
| 7,925,683 B2 | 4/2011 | Jain et al. |
| 7,954,104 B2 | 5/2011 | Amaki et al. |
| 7,979,670 B2 | 7/2011 | Saliba et al. |
| 8,099,573 B2 | 1/2012 | Camble |
| 8,140,637 B2 | 3/2012 | Slater et al. |
| 8,150,851 B2 | 4/2012 | Jones |
| 8,156,306 B1 | 4/2012 | Raizen et al. |
| 8,161,255 B2 | 4/2012 | Anglin et al. |
| 8,214,517 B2 | 7/2012 | Dubnicki et al. |
| 8,332,404 B2 | 12/2012 | Camble et al. |
| 8,499,131 B2 | 7/2013 | Lillibridge |
| 8,543,782 B2 | 9/2013 | Fineberg |
| 8,782,368 B2 | 7/2014 | Lillibridge |
| 8,959,089 B2 | 2/2015 | Lillibridge |
| 2001/0001870 A1 | 5/2001 | Ofek |
| 2001/0010070 A1 | 7/2001 | Crockett |
| 2001/0011266 A1 | 8/2001 | Baba |
| 2002/0133491 A1 | 9/2002 | Sim et al. |
| 2002/0156901 A1 | 10/2002 | Erickson et al. |
| 2002/0156912 A1 | 10/2002 | Hurst |
| 2002/0164956 A1 | 11/2002 | Maltz et al. |
| 2002/0169934 A1 | 11/2002 | Krapp |
| 2002/0177910 A1 | 11/2002 | Quarterman et al. |
| 2003/0065898 A1 | 4/2003 | Flamma et al. |
| 2003/0101449 A1 | 5/2003 | Bentolila |
| 2003/0140051 A1 | 7/2003 | Fujiwara |
| 2004/0078293 A1* | 4/2004 | Iverson et al. .................. 705/27 |
| 2004/0098547 A1 | 5/2004 | Ofek et al. |
| 2004/0148365 A1 | 7/2004 | Tripathi |
| 2004/0162953 A1 | 8/2004 | Yoshida |
| 2005/0091234 A1 | 4/2005 | Hsu |
| 2005/0108433 A1 | 5/2005 | Wu |
| 2005/0125599 A1 | 6/2005 | Gilfix et al. |
| 2005/0131939 A1 | 6/2005 | Douglis |
| 2005/0204108 A1 | 9/2005 | Ofek et al. |
| 2005/0210057 A1 | 9/2005 | Sprague et al. |
| 2005/0228802 A1 | 10/2005 | Kezuka et al. |
| 2005/0246376 A1 | 11/2005 | Lu et al. |
| 2005/0268068 A1 | 12/2005 | Ignatius et al. |
| 2006/0026165 A1 | 2/2006 | Mohamed et al. |
| 2006/0047855 A1 | 3/2006 | Gurevich et al. |
| 2006/0059171 A1 | 3/2006 | Borthakur |
| 2006/0059173 A1 | 3/2006 | Hirsch |
| 2006/0059207 A1 | 3/2006 | Hirsch |
| 2006/0069890 A1 | 3/2006 | Cox et al. |
| 2006/0116990 A1 | 6/2006 | Margolus et al. |
| 2006/0149703 A1 | 7/2006 | Poyourow |
| 2006/0167922 A1 | 7/2006 | Poyourow |
| 2006/0168409 A1 | 7/2006 | Kahn et al. |
| 2006/0182050 A1 | 8/2006 | Dohm |
| 2006/0224846 A1 | 10/2006 | Amarendran et al. |
| 2006/0282457 A1 | 12/2006 | Williams |
| 2006/0293859 A1 | 12/2006 | Pipke |
| 2007/0016727 A1 | 1/2007 | Peters et al. |
| 2007/0022145 A1 | 1/2007 | Kavuri |
| 2007/0124415 A1 | 5/2007 | Lev-Ran |
| 2007/0208788 A1 | 9/2007 | Chakravarty et al. |
| 2007/0220197 A1 | 9/2007 | Lasser |
| 2007/0250519 A1 | 10/2007 | Fineberg |
| 2007/0250670 A1 | 10/2007 | Fineberg |
| 2007/0250673 A1 | 10/2007 | Eidswick |
| 2007/0250674 A1 | 10/2007 | Fineberg et al. |
| 2007/0255758 A1 | 11/2007 | Zheng |
| 2008/0025298 A1 | 1/2008 | Lev-Ran et al. |
| 2008/0052468 A1 | 2/2008 | Speiers |
| 2008/0104347 A1 | 5/2008 | Iwamura et al. |
| 2008/0104443 A1 | 5/2008 | Akutsu et al. |
| 2008/0120459 A1 | 5/2008 | Kaneda et al. |
| 2008/0126176 A1 | 5/2008 | Iguchi |
| 2008/0133536 A1 | 6/2008 | Bjorner et al. |
| 2008/0133561 A1 | 6/2008 | Dubnicki et al. |
| 2008/0244210 A1 | 10/2008 | Vingralek |
| 2008/0256326 A1 | 10/2008 | Patterson |
| 2008/0270461 A1 | 10/2008 | Gordon et al. |
| 2008/0281877 A1 | 11/2008 | Wayda et al. |
| 2008/0294660 A1 | 11/2008 | Patterson et al. |
| 2008/0294696 A1 | 11/2008 | Frandzel |
| 2008/0298282 A1 | 12/2008 | Dawson et al. |
| 2008/0301086 A1 | 12/2008 | Gupta |
| 2008/0301111 A1 | 12/2008 | Statchuk |
| 2008/0301256 A1 | 12/2008 | McWilliams et al. |
| 2009/0013129 A1 | 1/2009 | Bondurant |
| 2009/0013140 A1 | 1/2009 | Bondurant et al. |
| 2009/0019246 A1 | 1/2009 | Murase |
| 2009/0024812 A1 | 1/2009 | Boyd et al. |
| 2009/0037499 A1 | 2/2009 | Muthulingam |
| 2009/0043830 A1 | 2/2009 | Lu et al. |
| 2009/0077252 A1 | 3/2009 | Abdo et al. |
| 2009/0077342 A1 | 3/2009 | Chen |
| 2009/0112945 A1 | 4/2009 | Camble |
| 2009/0112946 A1 | 4/2009 | Jones |
| 2009/0113167 A1 | 4/2009 | Camble |
| 2009/0177856 A1 | 7/2009 | Herne |
| 2009/0234821 A1 | 9/2009 | Hirsch |
| 2009/0234855 A1* | 9/2009 | Hirsch et al. ...................... 707/6 |
| 2010/0082765 A1 | 4/2010 | Murase |
| 2010/0100528 A1 | 4/2010 | Brockway et al. |
| 2010/0174881 A1 | 7/2010 | Anglin et al. |
| 2010/0198792 A1 | 8/2010 | Camble |
| 2010/0205163 A1 | 8/2010 | Eshghi |
| 2010/0228999 A1 | 9/2010 | Maheshwari et al. |
| 2010/0235372 A1 | 9/2010 | Camble |
| 2010/0235485 A1 | 9/2010 | Lillibridge |
| 2010/0246709 A1 | 9/2010 | Lillibridge |
| 2010/0280997 A1 | 11/2010 | Lillibridge |
| 2010/0281077 A1 | 11/2010 | Lillibridge |
| 2010/0281230 A1 | 11/2010 | Rabii et al. |
| 2011/0040763 A1 | 2/2011 | Lillibridge |
| 2011/0173430 A1 | 7/2011 | Kacin |
| 2011/0252217 A1 | 10/2011 | Lillibridge |
| 2012/0137097 A1 | 5/2012 | Slater |

FOREIGN PATENT DOCUMENTS

| | | |
|---|---|---|
| EP | 2012235 | 1/2009 |
| WO | 2006/030326 A1 | 3/2006 |
| WO | 2006030326 A1 | 3/2006 |
| WO | WO-2006032049 | 3/2006 |
| WO | WO-2009030326 | 3/2006 |
| WO | 2006094365 A1 | 9/2006 |
| WO | 2006094366 A1 | 9/2006 |
| WO | 2006094367 A1 | 9/2006 |
| WO | 2007127248 A2 | 11/2007 |
| WO | 2009054828 A1 | 4/2009 |
| WO | WO-2009054827 | 4/2009 |
| WO | 2009131585 A1 | 10/2009 |

OTHER PUBLICATIONS

Baoyao, Zhou; "'Intelligent Web Usage Mining'" Nanyang Technological University, Division of Information Systems, School of Computer Engineering, 2004 (94 pages).

Baynote Inc.: The Collective Intelligence Platform, Online, http://www.baynote.com/technology/platform/ 2010 (1 page).

Hottolink Inc.; "Recognize" Online, http://www.hottolink.co.jp/english/reconize.html, 2009 (2 pages).

(56) References Cited

OTHER PUBLICATIONS

Andrejko et al.: User Characteristics Acquisition from Logs with Semantics, Slovak University of Technology in Bratislava, 2007 (8 pages).
Hongjun Lu et al: Extending a Web Browser with Client-Side Mining, Hong Kong University of Science and Technology Department of Computer Science, Clear Water Bay, Kowloon, Hong Kong, China, 2003 (12 pages).
Shankar et al.; ""Personalized Web Search Based on Client Side Ontology"", CS 498: B.Tech Project,10. IIT Kanpur, India 2010 (9 pages).
Sendhikumar et al.; "Personalized ontology for web search personalization" Anna University, Chennai, India , 2008 (7 pages).
Shahabi et al.; "Yoda an Accurate and Scalable Web based Recommendation System?" University of SouthernCalifornia, Los Angeles, Sep. 2001 (14 pages).
Why Wubat? Website User Behavior & Analysis Tool, Wubat, Online, http://www.wubat.com/ (3 pages).
Claypool et al.; "Implicit Interest Indicators", Worcester Polytechnic Institute, Worcester, Computer Science Department Worcester Polytechnic Institute Worcester, MA 01609, USA., 2001 (8 pages).
Shahabi et al., Efficient and Anonymous Web Usage Mining Based on Client-Side Tracking, University of Southern California, Los Angeles, 2002 (48 pages).
Clattertrap; Online http://www.clattertrap.com; Jul. 20, 2010 (1 page).
HSNW: SRI defense technology spawns civilian application: published Jun. 29, 2010 (2 pages).
Anthony Ha: Facebook investor backs Chattertrap, a personal assistant for content, Jun. 28, 2010 (6 pages).
U.S. Appl. No. 11/411,467, Non-Final Rejection dated Jan. 27, 2009 (pp. 1-9 and attachments).
U.S. Appl. No. 11/411,467, Final Rejection dated Aug. 11, 2009 (pp. 1-11 and attachment).
U.S. Appl. No. 11/411,467, Examiner's Answer dated May 11, 2010 (pp. 1-11 and attachment).
European Patent Office, International Appl. No. PCT/US2007/010015, Search Report and Written Opinion dated Jan. 2, 2008 (12 pages).
European Patent Office, EP 07756010.0, Examination Report dated Feb. 20, 2009 (4 pages).
Muthitacharoen Athicha, et al., "A Low-Bandwidth Network File System," Proceedings of the 18th ACM Symposium on Operating Systems Principles (SOSP '01), Oct. 2001.
L. L. You and C. Karamanolis. Evaluation of Efficient Archival Storage Techniques. In Proceedings of the 21st IEEE / 12th NASA Goddard Conference on Mass Storage Systems and Technologies, pp. 227-232, College Park, Maryland, Apr. 2004.
You L. L. et al., "Deep Store an Archival Storage System Architecture" Data Engineering, 2005. ICDE 2005. Proceedings. 21st. intl Conf on Tokyo, Japan, Apr. 5-8, 2005, pp. 12.
Korean Intellectual Property Office, International Appl. No. PCT/US2007/0022586, Search Report and Written Opinion dated Jul. 23, 2008 (pp. 1-12).
Korean International Property Office, PCT/US2008/061576 Search Report dated Jan. 23, 2009 (2 pages).
Eshghi et al., "Jumbo Store: Providing Efficient Incremental Upload and Versioning for a Utility Rendering Service," 2007 (16 pages).
Mark David Lillibridge et al., U.S. Appl. No. 12/432,804 entitled "Batching Requests for Accessing Differential Data Stores," filed Apr. 30, 2009 (29 pages).
Mark David Lillibridge et al., U.S. Appl. No. 12/432,807 entitled "Copying a Differential DTA Store Into Temporary Storage Media in Response to a Request," filed Apr. 30, 2009 (28 pages).
U.S. Appl. No. 10/870,783, Non-Final Rejection dated Dec. 15, 2006, pp. 1-4 and attachments.
U.S. Appl. No. 10/870,783, Notice of Allowance dated Jun. 13, 2007 (7 pages).
UK Intellectual Property Office Search Report, GB 0511574.6 dated Oct. 19, 2005 (1 page).
UK Intellectual Property Office, Examination Report, GB 0511574.6 dated Jul. 19, 2007 (6 pages).
Translation of Japanese Office Action, JP 2005-173488, Notice of Rejection dated Aug. 5, 2008 (8 pages).
Translation of German Office Action dated Jul. 7, 2006, DE 10 2005023128.4-53 (3 pages).
Translation of German Office Action dated Feb. 7, 2008, DE 10 2005023128.4-53 (6 pages).
Brin, Sergey, et al., "Copy Detection Mechanisms for Digital Documents", Department of Computer Science, Stanford University, Oct. 31, 1994, p. 1-12.
Manber, Udi, "Finding Similar Files in a Large File System," Department of Computer Science, University of Arizona, TR 93-33, Oct. 1993, (11 pages).
Rabin, M.O., "Fingerprinting by Random Polynomials," Technical Report, Center for Research in Computing Technology, Harvard University, 1981, Report TR-15-81 (14 pages).
Korean Intellectual Property Action, International Appl. No. PCT/US2007/022629 Search Report dated Jul. 24, 2008 (2 pages).
Korean Intellectual Property Office, International Appl. No. PCT/US2007/022585 Search Report dated Jul. 15, 2008 (2 pages).
U.S. Appl. No. 12/671,346, Non-Final Rejection dated Mar. 29, 2012, pp. 1-24 and attachments.
U.S. Appl. No. 12/257,659, Non-Final Rejection dated Apr. 28, 2011, pp. 1-23 and attachment.
U.S. Appl. No. 12/257,659, Final Rejection dated Nov. 14, 2011, pp. 1-32 and attachments.
U.S. Appl. No. 12/671,334, Non-Final Rejection dated Apr. 12, 2012, pp. 1-20 and attachments.
U.S. Appl. No. 12/258,638, Non-Final Rejection dated Sep. 23, 2011, pp. 1-9 and attachments.
U.S. Appl. No. 12/258,638, Notice of Allowance dated Jan. 5, 2012, pp. 1-4 and attachments.
U.S. Appl. No. 12/256,329, Non-Final Rejection dated May 25, 2011, pp. 1-17 and attachments.
U.S. Appl. No. 12/256,329, Notice of Allowance dated Sep. 14, 2011, pp. 1-6 and attachments.
China 4 MO Office Action, application No. 200780101502.1 dated Dec. 23, 2011, 10 pages.
August, David, Lecture, COS 217, Optimizing Malloc and Free, Nov. 2007 (8 pages).
Bigelow, Stephen, Data Deduplication Explained, 2007 Storage Magazine, http://cdn.ttgtmedia.com/searchStorage/downloads/StorageExtra_DataDupe.pdf, 4 pps.
ComputerWeekly.com, How data deduplication works, TechTarget, Nov. 6, 2007, http://www.computerweekly.com/feature/How-data-deduplication-works, 2 pps.
Doug Lea, A Memory Allocator, Apr. 2000 (6 pages).
Freeman, Larry, Looking Beyond the Hype: Evaluating Data Deduplication Solutions, Netapp White Paper, WP-7028-0907, Sep. 2007, http://storage-brain.com/wp-content/uploads/papers/Evaluating_Data_Deduplication_Solutions.pdf, 12 pps.
Jula, Alin et al., How to Focus on Memory Allocation Strategies, Jun. 18, 2007, 29 pps.
Korean Intellectual Property Office, International Search Report and Written Opinion for PCT/US2007/022585 dated Jul. 15, 2008 (7 pages).
Korean Intellectual Property Office, ISR/WO PCT/US2007/022629, International Search Report and Written Opinion, Jul. 24, 2008, 13 pps.
Korean Intellectual Property Office, Notification of Transmittal of the International Search Report and the Written Opinion of the International Searching Authority, or the Declaration for International Appl. No. PCT/US2008/061576 dated Jan. 23, 2009 (13 pages).
Litwin, Witold, Linear Hashing: A new tool for file and table addressing, I.N.R.I.A., published by IEEE 1980; pp. 212-223.
Llewellyn, Mark, COP 3530C—Computer Science III, Summer 2002, http://www.cs.ucf.edu/courses/cop3530-su02, 24 pps.
Manegold, Stefan et al, Databases Techniek, 2005, http://homepages.cwi.nl/~manegold/teaching/DBtech, Archiviert in http://www.archive.org am Sep. 16, 2005, 20 pps.

(56) References Cited

OTHER PUBLICATIONS

Muthitacharoen, Athicha et al., A Low-bandwidth Network File System, MIT Lab for Compuer Science and NYU Dept. of Computer Science, 2001, 14 pps.

Portion of U.S. file history for U.S. Appl. No. 11/411,467, including Patent Board Decision dated Jun. 11, 2013 and Notice of Allowance dated Jun. 19, 2013 (14 pages).

Portion of U.S. file history for U.S. Appl. No. 12/671,334, including OAs dated Sep. 10, 2012, May 14, 2013, Nov. 21, 2013, and Notice of Allowance dated Mar. 3, 2014, Jun. 10, 214, and Aug. 5, 2014 (123 pages).

Portion of U.S. file history for U.S. Appl. No. 12/671,346, including OA dated Sep. 10, 2012, Examiner's Answer dated May 9, 2013, and Patent Board Decision—Examiner Affirmed dated Nov. 6, 2015 (51 pages).

U.S. Appl. No. 12/257,659, Notice of Allowance dated Aug. 15, 2012 (15 pages).

U.S. file history for U.S. Appl. No. 12/239,263, including OAs dated Feb. 10, 2011, Jul. 20, 2011, and Notice of Allowance dated Nov. 16, 2011 (45 pages).

U.S. file history for U.S. Appl. No. 12/777,478, including OAs dated May 3, 2012, Oct. 24, 2012, and Notice of Allowances dated Apr. 10, 2013, Mar. 31, 2014 (41 pages).

U.S. file history for U.S. Appl. No. 12/988,365, including OAs dated Jun. 27, 2012, Jan. 2, 2013, Oct. 29, 2013, Jun. 18, 2014, and Notice of Allowances dated Aug. 18, 2014 and Dec. 5, 2014 (92 pages).

U.S. file history for U.S. Appl. No. 13/367,567, including OAs dated Sep. 5, 2013, Mar. 26, 2014, and Examiner's Answer dated Nov. 17, 2014 (85 pages).

UK Intellectual Property Office, Examination Report for GB1000243.4 dated Jan. 23, 2012 (9 pages).

UK Intellectual Property Office, Examination Report for GB1000243.4 dated May 30, 2012 (3 pages).

United Kingdom Intellectual Property Office, GB Application No. GB1015473.0, Examination Report dated May 31, 2012 (3 pages).

United Kingdom Intellectual Property Office, GB Application No. GB1015473.0, Examination Report dated Mar. 6, 2012 (3 pages).

Zaiane, Osmar R et al, Database Systems and Structures, CMPT 354, Summer 1998, http://www.cs.sfu.ca/CourseCentral/354/zaiane/, 18 pps.

Zhu, Benjamin et al, Avoiding the disk bottleneck in the data domain deduplication file system, Proceedings of the 6th USENIX Conference on File and Storage Technologies, Feb. 29, 2008, http://usenix.org/events/fast08/tech/full_papers/zhu/zhu.pdf, pp. 269-282.

\* cited by examiner

DATA PROCESSING APPARATUS AND METHOD OF PROCESSING DATA

BACKGROUND OF THE INVENTION

Data held on a primary data storage medium may be backed-up to secondary data storage medium. The secondary data storage medium may be in a different location to the primary data storage medium. Should there be at least a partial loss of the data on the primary data storage medium, data may be recovered from the secondary data storage medium. The secondary data storage medium may contain a history of the data stored on the primary data storage medium over a period of time. On request by a user, the secondary data storage medium may provide the user with the data that was stored on the primary data storage medium at a specified point in time.

Data back-up procedures may be carried out weekly, daily, hourly, or at other intervals. Data may be backed-up incrementally, where only the changes made to the data on the primary data medium since the last back-up are transferred to the secondary data storage medium. A full back-up may also be performed, where the entire contents of the primary data medium are copied to the secondary data medium. Many other back-up strategies exist.

When backing-up data, a particular part of the data being backed-up may have previously been stored to the primary data storage medium, which may especially be the case when full back-ups are carried out. Storing the same data numerous times represents an inefficient use of a data storage medium.

SUMMARY OF THE INVENTION

In one embodiment, the present invention provides data processing apparatus comprising: a chunk store configured for containing specimen data chunks, a discrete manifest store, configured for containing at least one manifest that represents at least a part of a data set and that comprises at least one reference to at least one of said specimen data chunks, the processing apparatus being operable to process input data into input data chunks and to identify at least one manifest in the manifest store that includes at least one said reference to a said specimen data chunk corresponding to at least one of said input data chunks.

In an embodiment, the data processing apparatus is operable to analyse said identified at least one manifest and identify at least one said reference to a said specimen data chunk corresponding to at least one further input data chunk.

In an embodiment, the data processing apparatus is operable to store at least one of said input data chunks in the chunk store as a specimen data chunk, should said at least one input data chunk, in use, be found not to correspond to at least one of said specimen data chunks in the chunk store.

In an embodiment, the data processing apparatus is configured to comprise a chunk index containing information relating to said specimen data chunks contained in the chunk store.

In an embodiment, the data processing apparatus is configured to comprise a chunk index containing information relating only to some of said specimen data chunks contained in the chunk store.

In an embodiment, the apparatus is operable to identify said corresponding specimen data chunk using said information contained in the chunk index.

In an embodiment, the information contained in the chunk index includes details of at least one said manifest in the manifest store comprising a reference to at least one of said specimen data chunks.

In an embodiment, the information contained in the chunk index includes a chunk identifier of at least one of said specimen data chunks.

In an embodiment, the chunk identifier is a partial chunk identifier corresponding to one or more of said specimen data chunks.

In an embodiment, the apparatus is operable to generate a chunk identifier of a said input data chunk to be processed.

In an embodiment, the apparatus is operable to identify said corresponding specimen chunk by comparing the chunk identifier of said specimen chunk with the chunk identifier of the said input data chunk.

In an embodiment, the manifest store is operable to contain information relating to said at least one manifest stored therein.

In an embodiment, the manifest store contains a chunk identifier of said the at least one specimen data chunk referenced by said at least one manifest.

In an embodiment, the data processing apparatus is operable to analyse said identified at least one manifest and identify at least one said reference to a said specimen data chunk corresponding to at least one further input data chunk, by comparing a chunk identifier of a said input data chunk with the chunk identifier of said at least one specimen data chunk 6 stored in the manifest store.

In an embodiment, a corresponding specimen data chunk has a chunk identifier which is at least partially similar to a chunk identifier of a said input data chunk.

In another embodiment, the present invention provides data processing apparatus comprising: a chunk store containing specimen data chunks of previously processed data sets, a chunk index containing a chunk identifier for at least one of said specimen data chunks, a discrete manifest store, containing at least one manifest that represents a previously processed data set and that comprises at least one reference to at least one of said specimen data chunks, the processing apparatus being configured to divide input data to be processed into input data chunks; generate a chunk identifier for at least one of said input data chunks, identify a corresponding chunk identifier in the chunk index; and identify therefrom at least one of said manifests in the manifest store comprising at least one reference to a specimen data chunk identical to said input data chunk.

In another embodiment, the present invention provides a data compactor comprising: a chunk store configured for containing specimen data chunks, a discrete manifest store, configured for containing at least one manifest that represents a data set and that comprises at least one reference to at least one of said specimen data chunks, the compactor being configured to divide input data into input data chunks, select one of said input data chunks and identify at least one manifest having at least one reference to a specimen data chunk corresponding to the said selected input data chunk and to explore the at least one identified manifest for references to other specimen data chunks corresponding to other input data chunks of the data set.

In another embodiment, the present invention provides a method of processing input data, using: a chunk store containing specimen data chunks, a discrete manifest store, containing at least one manifest that represents a data set and that comprises at least one reference to at least one of said specimen data chunks, the method comprising processing said input data into input data chunks and identifying at least one said manifest in the manifest store that includes at least one said reference to a said specimen data chunk corresponding to a said input data chunk.

In an embodiment, the method comprises reviewing the identified at least one manifest to find at least one further specimen data chunk corresponding to at least one further said input data chunk of said input data.

In another embodiment, the present invention provides a method of processing input data, using: a chunk store containing specimen data chunks of previously processed data sets, a chunk index containing a chunk identifier for at least one of said specimen data chunks, a discrete manifest store, containing at least one manifest that represents a previously processed data set and that comprises at least one reference to at least one of said specimen data chunks, the method comprising, dividing the input data into input data chunks, generating a chunk identifier for one of said input data chunks, identifying a corresponding chunk identifier in said chunk index and identifying therefrom at least one manifest in said manifest database containing a reference to a specimen data chunk identical to said input data chunk.

BRIEF DESCRIPTION OF THE DRAWINGS

Embodiments of the invention will now be described, by way of example only, with reference to the accompanying drawings, in which.

DETAILED DESCRIPTION

Figure 1:
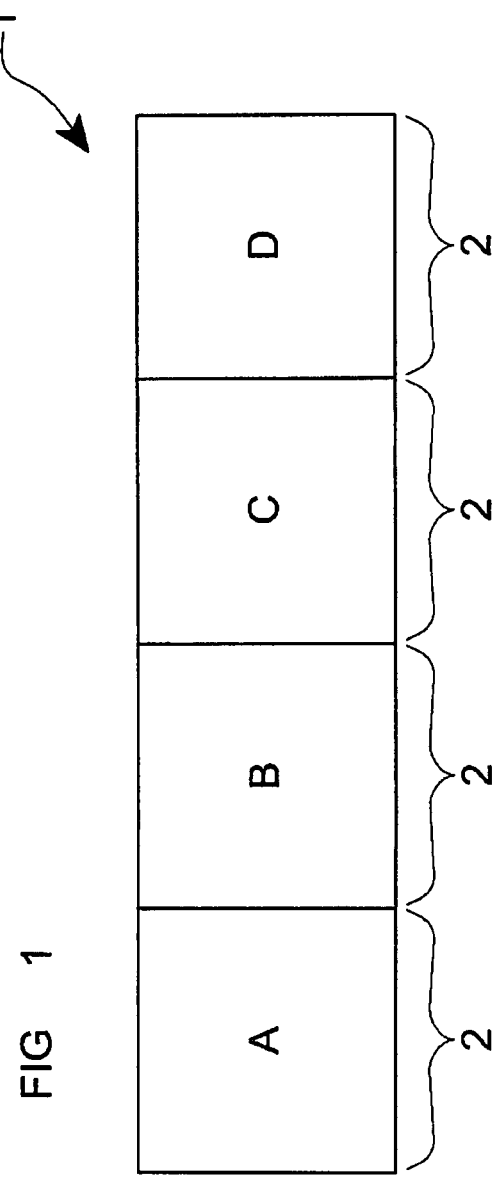
FIG. 1 shows a schematic representation of a data set.

FIG. 1 shows a schematic representation of a data set 1. A data set 1 may be shorter or longer than that shown in FIG. 1. A data set 1 comprises an amount of data, which may be in the order or 10 bytes, 1000 bytes, or many millions of bytes. A data set may represent all the data for a given back-up operation, or at least a part of a larger data set.

A back-up data set may comprise a continuous data stream or a discontinuous data stream. Whichever, the data set may contain many distinct, individual files or parts of files. The data set may not be partitioned into the individual files it contains. The data set may contain embedded information, comprising references to the boundaries of the individual files contained in the data set. The data set may then more easily be dissected into its constituent components. The size of the embedded information may represent a significant portion of the total data. Backing-up data with embedded file information increases the required capacity of the data storage medium.

Data processing apparatus according to an embodiment is operable to process an input data set into one or more input data chunks. An input data set may be divided into a plurality of input data chunks. Each input data chunk may represent an individual file, a part of an individual file, or a group of individual files within the input data set. The data set may be processed into input data chunks based on properties of the input data as a whole, with little or no regard to the individual files contained therein. The boundaries of data chunks may or may not be coterminous with file boundaries. The data chunks may be identical or varying in size.

FIG. 1 illustrates a schematic representation of an input data set 1 processed into data chunks 2. For convenience, each input data chunk is labelled in FIG. 1 from A-D, identifying that the data chunks 2 are distinct from one another. The input data set 1 may be divided into more input data chunks 2 than those shown in FIG. 1. An input data set 1 may be many terabytes in size, and be processed into 1 billion input data chunks. There are specific schemes available to the skilled person to determine how the input data set 1 is processed into input data chunks 2 and which information each input data chunk 2 contains.

Figure 2:
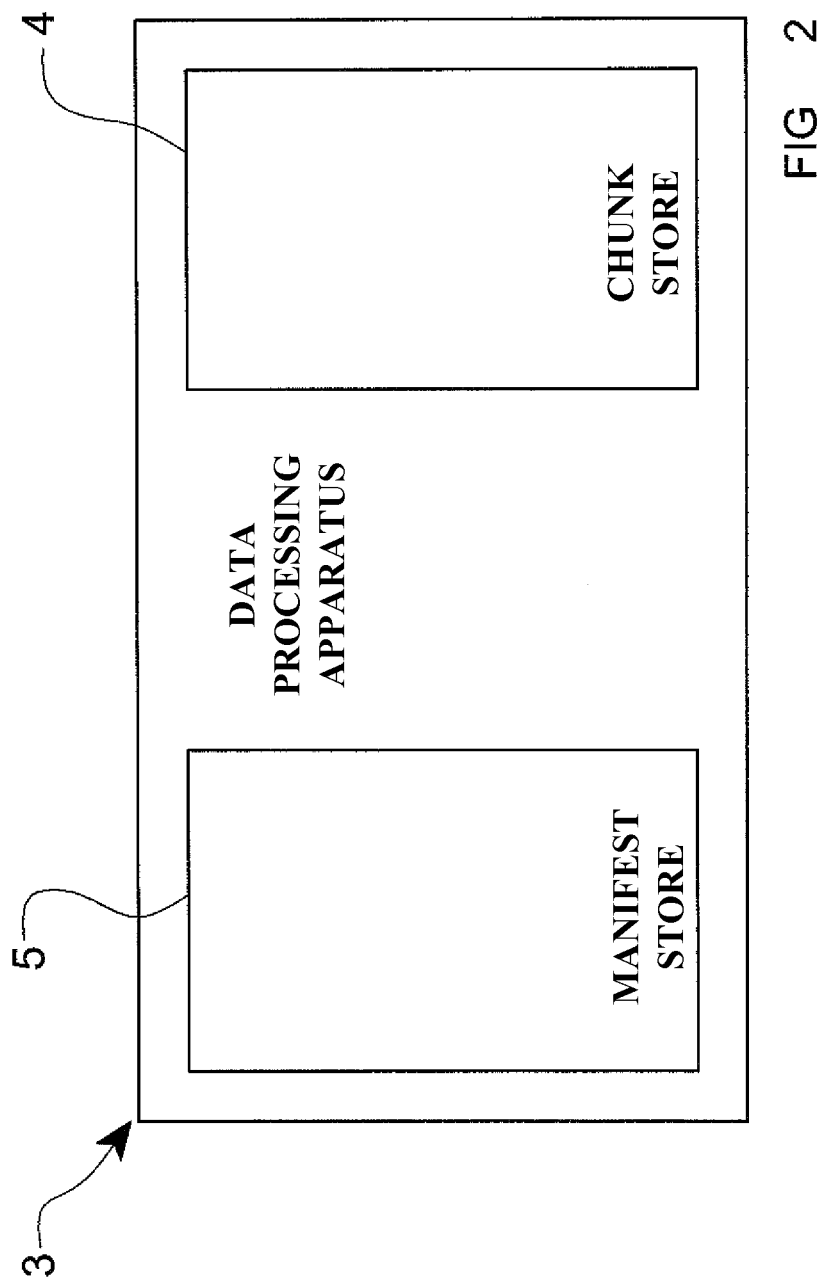
FIG. 2 shows a schematic representation of a data processing apparatus according to an embodiment.
Figure 3:
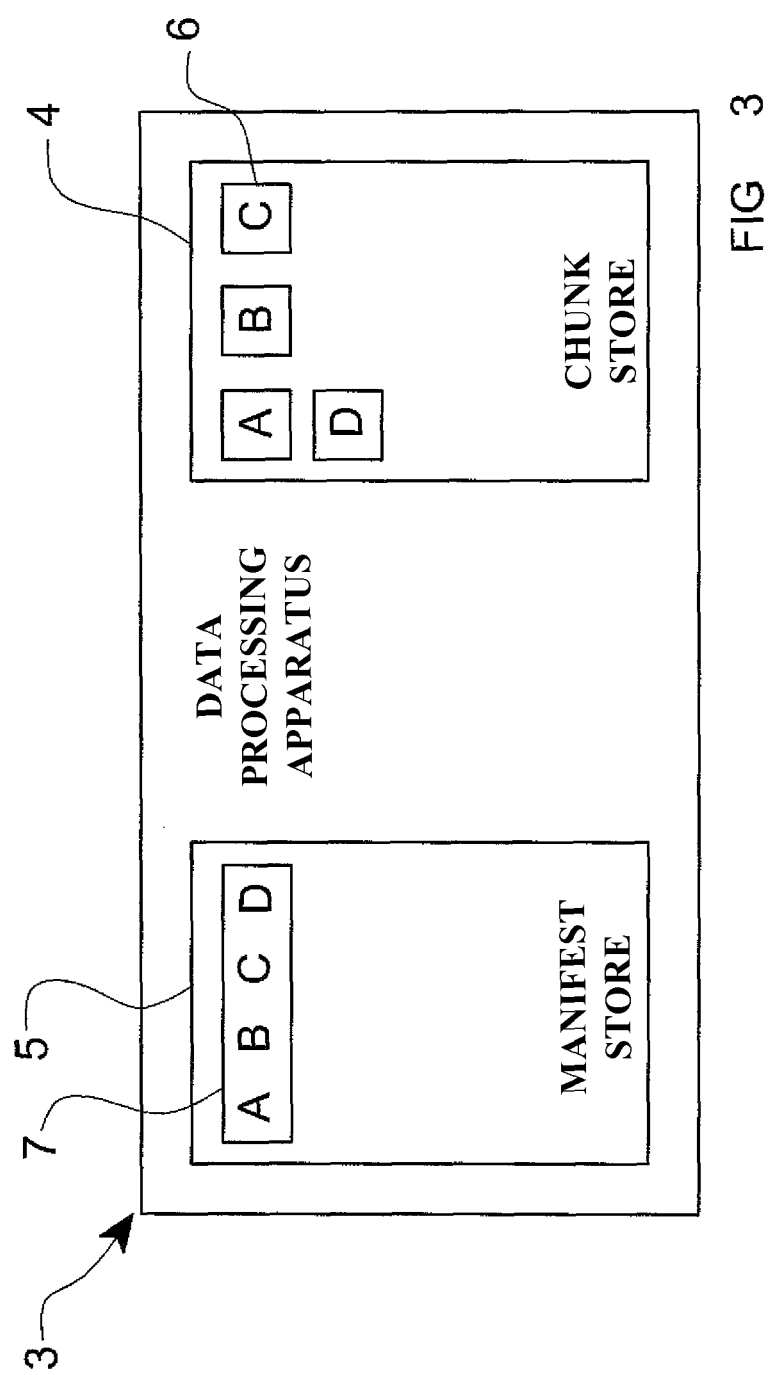
FIG. 3 shows a schematic representation of the data processing apparatus of FIG. 2, in use.

FIG. 2 shows data processing apparatus 3 (including at least one processor) according to an embodiment. The data processing apparatus 3 comprises a chunk store 4 and a manifest store 5. The manifest store 5 is discrete from, and separate to, the chunk store 4 but both stores 4, 5 may reside on a common data storage medium or memory device. As an input data set 1 is processed by data processing apparatus 3, the input data chunks 2 are stored to the chunk store 4 as specimen data chunks 6, as shown in FIG. 3. A specimen data chunk 6 is a carbon copy of an input data chunk 2. The chunk store 4 may store a plurality of specimen data chunks 6. The chunk store 4 may contains all the input data chunks 2 that have been previously processed by the data processing apparatus 3.

In one embodiment, both the chunk store 4 and manifest store 5 are stored in non-volatile storage.

As an input data chunk 2 is added to the chunk store 4 as a specimen data chunk 6, a manifest 7 is compiled. A manifest 7 is a representation of a data set 1. The manifest 7 comprises references to specimen data chunks 6 in the chunk store 4 which correspond to the input data chunks 2 comprising the input data set 1. So, the references of the manifest 7 may be seen as metadata to specimen data chunks 6. If the references to specimen data chunks 6 of a given manifest 7 are smaller in size than the specimen data chunks 6 referred to by the manifest 7, then it will be appreciated that a manifest 7 may be smaller in size than the input data set 1 it represents.

When an input data set 1 has been processed into input data chunks 2 and a manifest 7 compiled, representing the input data set 1, the manifest 7 is stored in the manifest store 5, as shown schematically in FIG. 3.

If a user of data processing apparatus 3 wishes to recover the data of a given input data set 1—which may relate to a back-up made at a particular point in time—the user will retrieve the corresponding manifest 7 from the manifest store 5. Each reference in the manifest 7 to specimen data chunks 6 in the chunk store 4 is then used to reconstruct the original data set 1.

Figure 4:
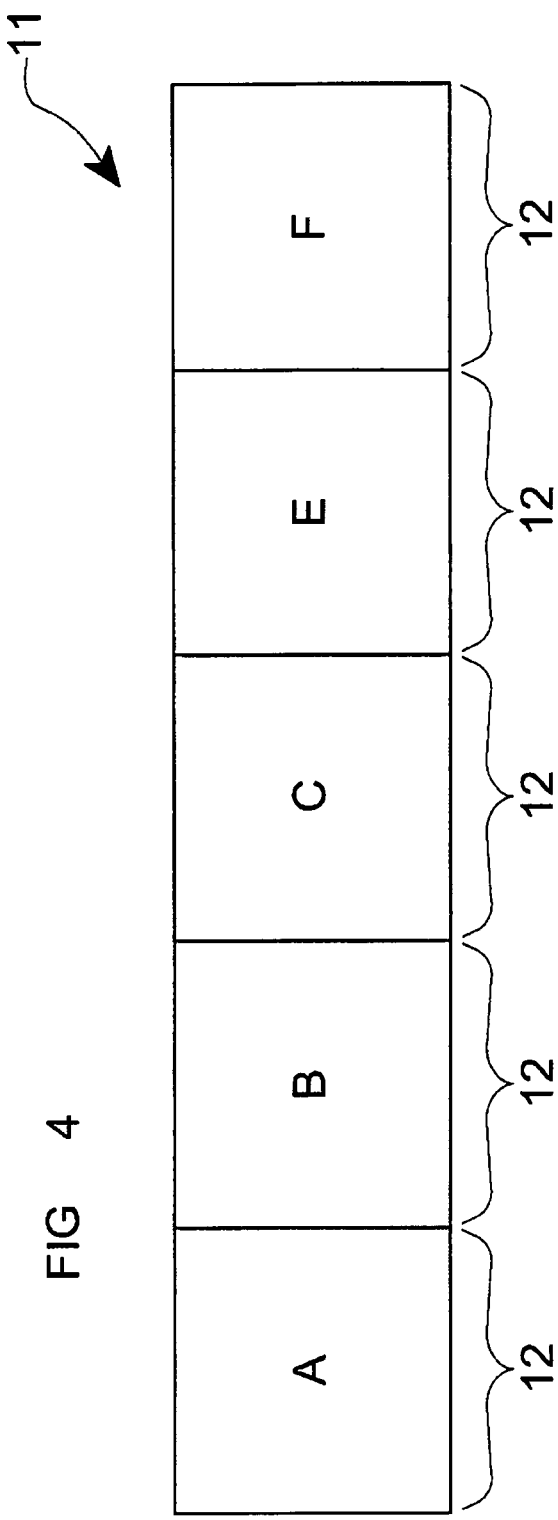
FIG. 4 shows a schematic representation of another data set.

A schematic representation of a second input data set 11 to be processed is illustrated in FIG. 4. Without data processing apparatus 3, the second input data set 11 may be stored in its entirety. Thus, even though both input data sets 1, 11 comprise the common input data chunks A, B and C, both occurrences of each would be stored, which is an inefficient use of a data storage medium.

With data processing apparatus 3, when the input data set 11 is presented to the data processing apparatus 3, the input data set 11 is processed into input data chunks 12. A data processing apparatus 3 is operable to identify at least one manifest 7 in the manifest store 5 that includes at least one reference to a specimen data chunk 6 corresponding to at least one of the input data chunks 12 of the second input data set 11. When processing the input data set 11 illustrated in FIG. 4, data processing apparatus 3 will identify that the manifest 7 stored in the manifest store 5 includes a reference to a specimen data chunk 6 corresponding to at least one of the input data chunks 12. In this example, the data processing apparatus may identify that the manifest 7 includes references to specimen data chunks A, B and C. After so identifying, the data processing apparatus 3 will not store the input data chunks A, B and C again in the chunk store 4, because they already exist therein as specimen data chunks 6. Instead, the manifest compiled for the input data set 11 will comprise references to specimen data chunks A, B and C already in the chunk store 4.

It will be noted that the chunk store 4 does not contain specimen data chunks 6 corresponding to input data chunks E and F. Similarly, the manifest 6 in the manifest store 5 does not contain references to specimen data chunks 6 corresponding to input data chunks E and F. Data processing apparatus is operable to determine that the chunk store 4 does not already contain specimen data chunks 6 corresponding to input data chunks E and F. Accordingly, data processing apparatus 3 may store the input data chunks E and F as specimen data chunks 6 in the chunk store 4. The manifest for the input data set 12 is then completed by adding references to specimen data chunks E and F. The new manifest is then added to the manifest store 5.

In one embodiment, after the data processing apparatus 3 has part compiled a manifest with references to specimen data chunks A, B and C, the data processing apparatus 3 is operable to select one of input data chunks E and F, and to attempt to identify at least one manifest 7 in the manifest store 5 that includes at least one reference to a specimen data chunk 6 corresponding to either one of input data chunks E and F. In the example illustrated, no such manifests will be located. Data processing apparatus 3 may be operable to identify manifests 7 including references to specimen data chunks corresponding to each input data chunk 2 of an input data set 1.

As a result, the chunk store 4 will contain only one occurrence of each specimen data chunk 6, which is an efficient use of the chunk store 4. The 'footprint' of storing the first 1 and second 11 input data sets using data processing apparatus may be smaller than the footprint of storing the first 1 and second 11 input data sets without using a data processing apparatus according to an embodiment.

With data processing apparatus 3 embodying the present invention, the data processing apparatus 3 processes the input data set 11 into input data chunks 12. The data processing apparatus may be operable to select an input data chunk 12 from the input data set 11. The selection may be the first input data chunk 12 in the input data set 11, or it may be another selection. The selection of an input data chunk 12 from the divided input data set 11 may be random or pseudo-random.

The data processing apparatus 3 uses the selected input data chunk 12 to identify a manifest 7 already stored in the manifest store 5 which includes at least one reference to a specimen data chunk 6 corresponding to the selected input data chunk 2. If the data processing apparatus 3 selects the first input data chunk 'A', then the manifest 7 in the manifest store 5 will be identified.

Having identified at least one manifest 7 in the manifest store 5 having a reference to a specimen data chunk 6, the data processing apparatus 3 is operable to analyse the at least one manifest 7 to identify a reference to a specimen data chunk 6 corresponding to at least one further input data chunk 12. In so doing, the data processing apparatus 3 is operable to identify, for the input data set 12 shown in FIG. 4, that the manifest 7 includes a reference not only to specimen data chunk A but also specimen data chunks B and C. Thus, in identifying that a manifest 7 contains a reference to a specimen data chunk 6 corresponding to just one input data chunk 12, the data processing apparatus 3 is operable to identify references to specimen data chunks 6 12 corresponding to further input data chunks 12 in the same input data set 11.

A benefit of data processing apparatus 3 is that an exhaustive search of the chunk store 4 for each and every input data chunk 2, to determine whether it has already been stored as a specimen data chunk 6, is not required. Instead, data processing apparatus 3 may utilise the manifests 7 created for previously processed and stored data sets. The benefits of data processing apparatus 3 are further demonstrated when the input data sets being processed are similar, to a large extent, to previously processed data sets. For example, between two full back-up operations, only a small portion of the respective data sets may be different. To have to methodically search through each specimen data chunk 6 stored in the chunk store 4, to find specimen data chunks 6 corresponding to each input data chunk of an input data set, is inefficient and time consuming.

Data processing apparatus 3 is able to exploit the fact that each input data set 1 being processed may be similar. As such, previous similar manifests can be used to compile at least a part of a new manifest for the latest input data set.

In one embodiment, having identified said at least one manifest, the data processing apparatus 3 is operable to search within that manifest for all other references to specimen data chunks 6 in the chunk store 4, to identify specimen data chunks 6 corresponding to further input data chunks 2 of the input data set 1 being processed. In one embodiment, the search is performed by selecting each input data chunk 2 from the input data set 1, save for the input data chunk 2 already selected, and comparing it with each reference in the at least one identified manifest. When a reference to a corresponding specimen data chunk 6 is found, the input data chunk 2 is represented in a new manifest with a reference to the specimen data chunk 6. Subsequent input data chunks 2 are then selected for subsequent searches. The search operation may continue until all input data chunks 2 have been compared with all references in the identified manifest(s).

In another embodiment, the search operation may be terminated when a predetermined number of references to specimen data chunks 6 corresponding to input data chunks 2 have been found. In another embodiment, the search operation may be terminated when the data processor 3 has failed to find references to specimen data chunks 6 corresponding to a predetermined number of input data chunks 2 in the input data set 1. A benefit of this embodiment is that manifests which do not contain references to specimen data chunks 6 corresponding to any other input data chunks 2 may quickly be discounted from the search procedure.

In another embodiment, having identified said at least one manifest using a selected input data chunk, the search operation to identify references to specimen data chunks 6 corresponding to other input data chunks 2 may be based on, or centred upon, the selected input data chunk which caused the at least one manifest to be identified by the data processing apparatus 3. For example, referring to FIG. 4, suppose that input data chunk B was selected by the data processing apparatus 3; and the manifest 6 stored in the manifest store 5 identified as above. It will be noted that adjacent the reference to specimen data chunk B in the manifest 6 are references to specimen data chunks A and C. Similarly, adjacent input data chunk B in input data set 12, are input data chunks A and C.

In one embodiment, having identified an input data chunk 12 corresponding to a specimen data chunk 6 referenced in a manifest, the input data chunks 12 adjacent the identified input data chunk 12 are compared with the specimen data chunks 6 referred to in the references adjacent the reference to the specimen data chunk 6 corresponding to the selected input data chunk 12. Thus, input data chunks A and C will be compared with specimen data chunks A and C. In this example, they will be found to match one another. As a result, the data processing apparatus 3 is operable to determine that two further specimen data chunks 6 in the chunk store 4 correspond to two of the input data chunks 12, by analysing the identified manifest 7. The identification is made without having to compare each and every input data chunk 12 with each specimen data chunk 6 in the chunk store 4.

A benefit of this embodiment is demonstrated when the chunk store 4 contains many specimen data chunks 6. Suppose that many of the specimen data chunks 6 have been stored in the chunk store 4 for a long period of time and new input data sets being presented to the processor no longer include input data chunks 2 which correspond to those 'old' specimen data chunks 6. Suppose further that a number of the most recently processed input data sets 1 contain references to the most recently added specimen data chunks 6 to the chunk store 4. Without data processing apparatus 3, each and every input data chunk 12 of new input data set 11 may be compared with each specimen data chunk 6 stored in the chunk store 4. Such data processing apparatus, not embodying the present invention, would, therefore, compare input data chunks 2 with specimen data chunks 6 which are unlikely to be found to match. This would especially be the case where the 'old' specimen data chunks 6 are stored at the beginning of the chunk store 4, and are therefore likely to be searched first.

Data processing apparatus 3, on the other hand, identifies at least one manifest 7 in the manifest store 5 that includes at least one reference to a specimen data chunk 6 corresponding to at least one input data chunk 2. Embodiments of the present invention, therefore, can exploit the fact that input data sets containing a particular input data chunk, which input data chunk corresponds to a specimen data chunk 6 already in the chunk store 4, may also contain input data chunks which correspond to other specimen data chunks 6 already stored in the chunk store 4.

In one embodiment of the invention, having identified at least one manifest 7 from a selected input data chunk 2, if specimen data chunks 6 corresponding to the input data chunks 2 adjacent the selected input data chunk 2 are not identified in the at least one manifest, then the processing apparatus 3 may seek to identify specimen data chunks 6 corresponding to the next adjacent input data chunks 2 to the selected input data chunk 2. If the processing apparatus is not able to identify a specimen data chunk 6 corresponding to an input data chunk 2 within a predetermined number of iterations, the search operation may be terminated. If more than one manifest 7 was identified by the processing apparatus 3 as including a reference to a specimen data chunk 6 corresponding to the selected input data chunk 2, then the search operation may re-commence on a further identified manifest 7.

The above described technique may be referred to as 'zipping', in that an input data set 1 and an identified manifest 7 are arranged such that an input data chunk 2 is aligned with the reference in the manifest 7 to a specimen data chunk 6 in the chunk store 4 corresponding to the input data chunk 2. Data processing apparatus 3 then seeks to 'zip' the input data set 1 and manifest 7 together. A successful 'zipping' procedure will result where a run of input data chunks 2 correspond to a run, of equal size, of references to specimen data chunks 6 in a manifest 7. The input data set 1 and manifest 7 will not successfully 'zip' together where a particular input data chunk 2 does not correspond to the reference to a specimen data chunk 6 in a manifest 7 attempting to be 'zipped' to the input data chunk 2.

Figure 5:
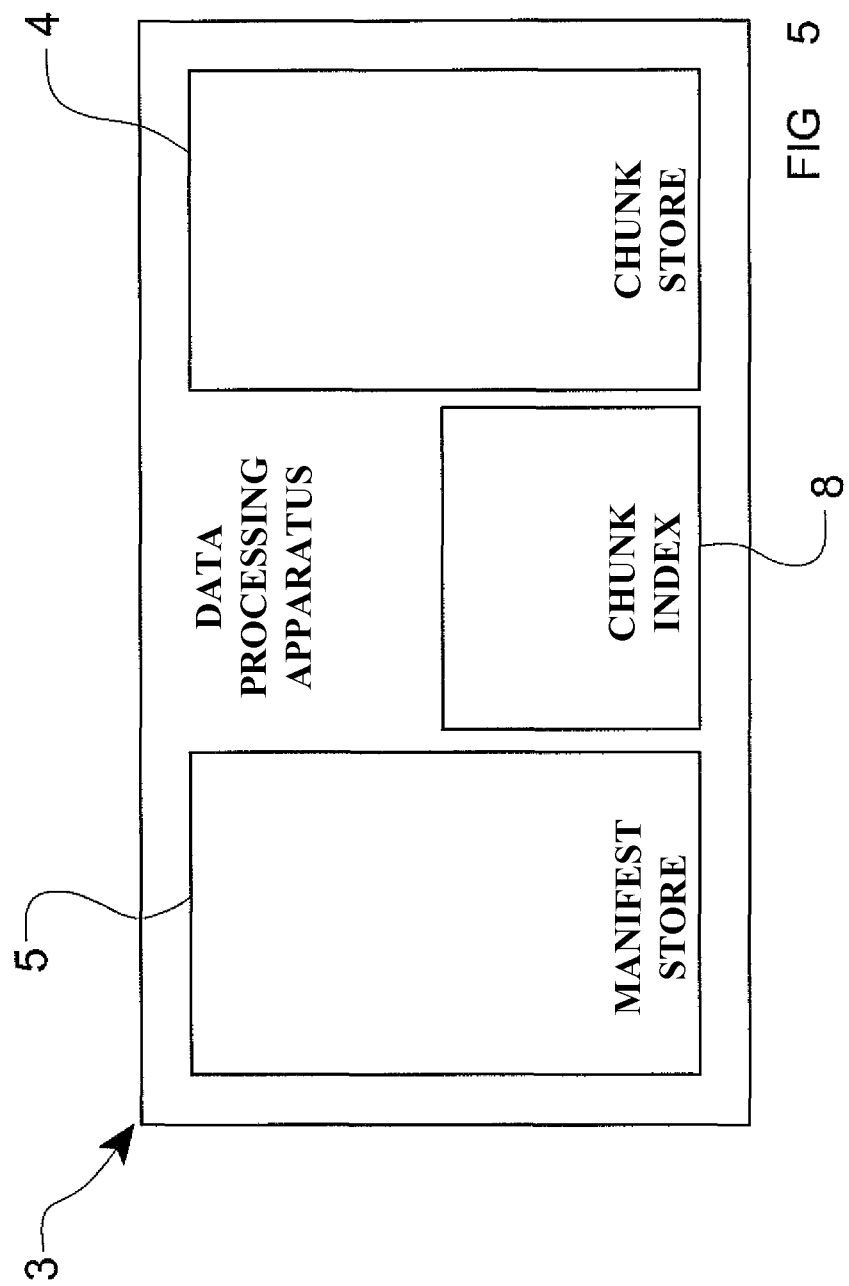
FIG. 5 shows a schematic representation of another data processing apparatus according to another embodiment.

In one embodiment, the data processing apparatus 3 further provides a chunk index 8, as shown in FIG. 5. The chunk index 8 contains information on at least one of the specimen data chunks 6 stored in the chunk store 4. In one embodiment, the chunk index 8 contains information relating only to some specimen data chunks 6 contained in the chunk store 4. The specimen data chunks 6 on which the chunk index 8 contains information may be specifically selected or randomly chosen. In another embodiment, the chunk index 8 may contain information on every specimen data chunk 6 stored in the chunk store 4.

In one embodiment, the chunk index 8 may be stored in volatile memory, such as random access memory (RAM).

In an embodiment of the present invention, the information contained in the chunk index 8 for a given specimen data chunk 6 may include a chunk identifier of the specimen data chunk. A chunk identifier may be a digital fingerprint of the specimen data chunk 6 to which it relates. The chunk identifier may be a unique chunk identifier, being unique for a particular specimen data chunk 6. The algorithm for generating chunk identifiers may be selected so as to be capable of generating unique chunk identifiers for a predetermined number of specimen data chunks 6. In one embodiment, the chunk identifier is generated using the SHA1 hashing algorithm. Other hashing algorithms may be used, such as SHA2. In one embodiment, the hashing algorithm is selected and configured such that it is substantially computationally infeasible that two specimen data chunks 6 would produce an identical chunk identifier.

In another embodiment, the information contained in the chunk index 8 for a given specimen data chunk 6 may include only a partial chunk identifier. For example, although the specimen data chunk 6 may have a unique chunk identifier, only a portion of the chunk identifier may be stored against the record for the specimen data chunk 6 in the chunk index 8. In one embodiment, the partial chunk identifier may comprise the first predetermined number of bits of the full chunk identifier. For example, if a full chunk identifier for a given specimen data chunk 6 comprises 20 bits (such as that produced by the SHA1 algorithm), the chunk index 8 may store, for example, 15 bits of the chunk identifier. The predetermined bits may be the most significant bits (MSB) of the chunk identifier, the least significant bits (LSBs) or intermediate bits of the full chunk identifier. It follows, therefore, that the partial identifiers of two different specimen data chunks 6 may be identical, even though their respective full chunk identifiers are different to one another; and unique. A benefit of storing only a partial chunk identifier in the chunk index 8 is that the size of the chunk index 8 is reduced.

In one embodiment, for a particular entry in the chunk index 8, relating to a given specimen data chunk 6, there are stored details of at least one manifest 7 in the manifest store 5 which includes a reference to said specimen data chunk 6. In one embodiment, there is stored a list of manifests 7 in the manifest store 5 which contain at least a reference to that specimen data chunk 6. In another embodiment, there may be stored only a partial list of the manifests 7 in the manifest store 5 which contain at least one reference to that specimen data chunk 6.

In one embodiment, for a given entry in the chunk index 8 relating to a specimen data chunk, there is stored a reference to at least one manifest in the manifest store which includes a reference to that specimen data chunk. In one embodiment, the reference may be to the manifest generally. In another embodiment, the reference may indicate the location within the manifest where there is a reference to the specimen data chunk.

In one embodiment, the information contained in the chunk index 8 for a given specimen data chunk may include a reference to the location of the specimen data chunk 6 in the chunk store 4. Thus, in this embodiment, the chunk store 4 itself may not keep a record of the location of the specimen data chunks 6 stored therein. Instead, the location of the specimen data chunks 6 is stored against the relevant entry in the chunk index 8. The chunk index 8, therefore, serves as an index to the specimen data chunks 6 stored in the chunk store 4.

In use, the manifest store 5 may contain many manifests 7, each representing a previously processed data set 1. In one embodiment, the manifest store 5 contains information relating to each manifest 7 contained therein. The information may include the properties associated with each manifest 7; such as its size, the number of references it contains or the name and other details of the data set which it represents. The information for a particular manifest may include a chunk identifier of at least one of the specimen data chunks 6 referenced by the manifest 7. Thus, a particular manifest 7 may not only include a set of references to specimen data chunks 6 stored in the chunk store 4, but a chunk identifier for each of those specimen data chunks 6 referenced. The chunk identifier may be a partial chunk identifier.

In one embodiment, having identified at least one manifest in the manifest store that includes at least one said reference to a said specimen data chunk corresponding to at least one of said input data chunks, data processing apparatus is operable to analyse the identified manifest to identify specimen data chunks corresponding to further input data chunks. In the embodiment where the manifest comprises a chunk identifier of each specimen data chunk referenced by the manifest, data processing apparatus is operable to compare the chunk identifier of input data chunks with the chunk identifiers in the manifest. The benefit of this is that no access to the information in the chunk index 8 may be required. Accordingly, performing a comparison procedure using the identified manifest, and not the chunk store 4, may allow for at least a part of the data for comparison to be processed whilst in RAM.

The manifest information may comprise the location of at least one of the specimen data chunks 6 in the chunk store 4, referenced by a manifest 7. In another embodiment, the location of a specimen data chunk 6 in the chunk store 4 that is referenced in a manifest 7 may be determined from the information stored in the chunk index 8.

Data processing apparatus 3 is operable to generate a chunk identifier of an input data chunk 2. In one embodiment, the data processing apparatus 3 is operable to generate a chunk identifier for each input data chunk 2 after, or at the same time as, the input data set 1 has been/is processed into input data chunks 2.

The chunk identifier generated for the input data chunk 2 may then be used to identify a specimen data chunk 6 in the chunk store 4 corresponding to the input data chunk 2. In one embodiment, the chunk identifier of the input data chunk 2 is compared with the chunk identifier of a specimen data chunk 6. A benefit of this is that the input data chunk 2, itself, is not directly compared with a specimen data chunk 6. Since the respective chunk identifiers may be smaller in size than the input/specimen data chunks 6 they represent, the comparison step, to see if the two chunk identifiers correspond to one another, may be performed more quickly. Moreover, since the chunk identifiers may be relatively smaller in size than the respective chunks to which they relate, the comparison step may be performed whilst both chunk identifiers are stored in RAM. If the chunk identifier of an input data chunk 2 is identical to the chunk identifier of a specimen data chunk, then input data chunk 2 and specimen data chunk will be identical to one another. This assumes, as noted above, that the algorithm for generating chunk identifiers is chosen so as to generate unique identifiers. The use of partial chunk identifiers will produce a non-unique set of identifiers meaning that one or more potential corresponding specimen data chunks will be identified.

In one embodiment, the processing apparatus is operable to compare the chunk identifier of an input data chunk 2 with the chunk identifiers stored in the chunk index 8. The comparison step may be performed by comparing the chunk identifier of an input data chunk 2 with each chunk identifier stored in the chunk index 8, in turn. Alternatively, the chunk identifiers in the chunk index 8 may be organised based on properties of the chunk identifiers. For example, the chunk identifiers in the chunk index 8 may be arranged in a tree configuration, based on the binary state of each bit of the chunk identifiers. In this example, the MSB of each chunk identifier may be analysed, and each chunk identifier allocated to a branch of the tree depending on the value of the MSB, i.e. either '0' or '1'. Each of the two 'branches' may further bifurcate based on the value of the next MSB. Each of those branches will bifurcate further, based on the following MSB, and so on.

With the above described configuration of the entries in the chunk index 8, the data processing apparatus 3, in attempting to find an entry in the chunk index 8 for a specimen data chunk 6 corresponding to a selected input data chunk 2, is operable to quickly 'drill down' the entries in the chunk index 8.

In some embodiments, by 'corresponding' is meant that the chunk identifier of an input data chunk 2 is identical to the chunk identifier of a specimen data chunk 6. The input data chunk 2 and specimen data chunk 6 are therefore said to be 'corresponding' to one another. Alternatively, where partial chunk identifiers are used, although the respective partial chunk identifiers for a given input data chunk 2 and specimen data chunk 6 may be identical, the actual input data chunk 2 and specimen data chunks 6 may not be identical, as described above. Nevertheless, the input data chunk 2 and specimen data chunk 6 are said to be corresponding, since at least their respective partial chunk identifiers are identical to one another.

In one embodiment of the present invention, after generating a chunk identifier for an input data chunk 2, and identifying a corresponding chunk identifier in the chunk index 8 relating to a specimen data chunk 6 stored in the chunk index 8, data processing apparatus 3 is operable to perform a verification procedure. The verification procedure comprises comparing the input data chunk 2 with the identified specimen data chunk 6 stored in the chunk store 4, to confirm whether the two data chunks are, in fact, identical. Without the verification procedure, and especially where partial chunk identifiers are used, it may be that a specimen data chunk 6 identified as 'corresponding' is not actually identical to the input data chunk 2. To include a reference to the non-identical specimen data chunk 6 will introduce an error in the manifest, and prevent accurate restoration of data represented in the manifests.

Even where full chunk identifiers are used, the verification procedure is advantageous, since either of the chunk identifiers (for the input data chunk 2 and the specimen data chunk 6) may have been generated, or stored, including errors. The verification procedure may increase the integrity of the information stored in the manifest.

In the embodiment where partial chunk identifiers are used, a processor according to an embodiment may identify more than one 'corresponding' specimen data chunk 6, for the reasons described above. Of course, the input data chunk 2 may only be identical to one of the specimen data chunks 6 stored in the chunk store 4. Accordingly, should more than one 'corresponding' specimen data chunk 6 be identified, the verification procedure allows for the data processing apparatus 3 to identify which of the more than one specimen data chunks 6 is truly identical to the input data chunk 2. Although when storing only partial chunk identifiers, the verification step necessarily constitutes a further step, there is still a benefit in that the chunk index 8 may be smaller in size, since it does not store full chunk identifiers. The reduction in the size of chunk index 8 needed may outweigh the disadvantages, if any, of performing the verification procedure.

In another embodiment, the verification procedure may be performed by comparing the chunk identifier of an input data chunk with a chunk identifier contained in an identified manifest. A benefit of this is that no access to chunk store may be required at all. The verification procedure may be performed using solely the information contained in the manifest and the chunk identifiers produced for the input data chunks. Where partial chunk identifiers are stored in the chunk index, there may exist the situation where the partial chunk identifier of an input data chunk matches the partial chunk identifier of a specimen data chunk, even though the respective input/specimen data chunks do not match one another. As a consequence, the at least one manifest identified as containing a reference to a specimen data chunk corresponding to an input data chunk may, not, in fact reference specimen data chunks corresponding to any input data chunks. In one embodiment, the data processing apparatus is operable to perform a verification procedure on the identified manifest(s). In one embodiment, when the at least one manifest has been identified, the chunk identifier stored in the manifest(s) of the specimen data chunk which was indicated as corresponding to an input data chunk is verified. Only if the chunk identifier is identical to the chunk identifier of the input data chunk may the manifest be used for subsequent operation. This embodiment may achieve the same effect as performing the verification procedure by referring to the chunk index, but does not require access to the chunk index. It will be appreciated that the returned manifest may be much smaller in size than the chunk store. Accordingly, performing a comparison procedure using the identified manifest, and not the chunk store 4, may allow for at least a part of the data for comparison to be processed whilst in RAM.

As described above, the chunk index 8 of one embodiment contains information relating only to some specimen data chunks 6 in the chunk store 4. Thus, the chunk index 8 may be said to be a 'sparse' chunk index 8. Maintaining such a 'sparse' chunk index reduces the size of the chunk index 8, a benefit of which will now be described.

The data processing apparatus may be used in compacting input data sets 1 for storage, encryption or transmission. For example the input data 1 may represent sets of back-up data from a first data storage medium, for storing on a second data storage medium. Data processing apparatus 3, as described above, compares a chunk identifier of an input data chunk 2 with the chunk identifiers stored in a chunk index 8. The step of comparison may require ready access to the data contained in the chunk index 8. In one embodiment, the chunk index 8 may be stored in random access memory (RAM). RAM allows quick, and random, access to the information contained therein. There may be a requirement, however, to reduce the RAM required for a data processing apparatus. By providing a sparse chunk index 8 to be stored in RAM, the data processing apparatus requires less RAM than a processor without a sparse index.

Without providing a chunk index 8, data processing apparatus may compare an input data chunk 2 with each specimen data chunk 6 stored in the chunk store 4. Since the chunk store 4 may be very large, it may be difficult, or simply not possible, to store the entire contents of the chunk store 4 in RAM. The chunk store 4 may be stored in non-volatile memory, such as on disk. Reading data from the chunk store 4, therefore, will require a disk reading operation. This may be significantly slower than accessing data stored in RAM. Data processing apparatus 3 comprises a chunk index 8, which may reside in RAM, allowing faster access to the information contained therein. As a result, specimen data chunks 6 stored in the chunk store 4 which correspond to an input data chunk 2 may more easily be identified, without requiring constant direct access to the chunk store 4. There may, as described above, be a verification procedure. This operation will require access to a specimen data chunk 6 stored in the chunk store 4, on disk, but this may require only one disk seek of the chunk store 4 and the retrieval of a single specimen data chunk 6.

With embodiments of the present invention comprising a sparse chunk index 8, there may exist the case where a specimen data chunk 6 corresponding to an input data chunk 2 exists in the chunk store 4; but there is no entry relating to the specimen data chunk 6 in the chunk index 8. Thus, when comparing a chunk identifier of the input data chunk 2 with the entries in the chunk store 4, data processing apparatus 3 may indicate, initially, that there is no corresponding specimen data chunk 6; and store the input data chunk 2 as a specimen data chunk 6 in the chunk store 4 for a second time. Although this instance of storing the input data chunk 2 as a specimen data chunk 6 for a second time may be seen as an inefficient use of the chunk store 4, the benefits of such an embodiment is that the chunk index 8 is sparse, and thus uses less space in RAM. The benefits of requiring less RAM, and the decrease in the time taken to search through the sparse chunk index 8 may outweigh the disadvantages of the storage of an input data chunk 2 as a specimen data chunk 6 for the second time.

Nevertheless, because data processing apparatus 3 is operable to take advantage of the fact that input data streams may be partially similar to one another, the data processing apparatus 3 may identify a specimen data chunk 6 in the chunk store 4, even though there may be no entry for the specimen data chunk 6 in the chunk index 8, as described below.

For a given number of input data chunks 2, even though specimen data chunks 6 corresponding to each may already be stored in the chunk store 4, only one specimen data chunk 6 may have an entry in the chunk index 8. Data processing apparatus 3 is operable to identify a corresponding specimen data chunk 6 in the chunk index 8. From the specimen data chunk 6, the data processing apparatus 3 identifies at least one manifest in the manifest store that includes at least one reference to the specimen data chunk 6. In subsequently analysing the identified at least one manifest, the data processing apparatus 3 is operable to identify that there are specimen data chunks 6 in the chunk store 4 which correspond to more input data chunks 2 of the input data stream, even though those specimen data chunks 6 may not have entries in the chunk index 8.

Thus, such data processing apparatus may be operable to identify all the specimen data chunks 6 in the chunk store 4 corresponding to all the input data chunks 2, whilst only comprising a sparse index. There may be no duplicate entries in the chunk store 4. Data processing apparatus 3 with a sparse chunk index 8 may be just as efficient at compacting input data as a data processor 3 with a full chunk index 8. By efficient is meant that the specimen data chunks 6 stored in the chunk store 4 are not duplicated, or at least not duplicated to a predetermined extent. Some duplication of specimen data chunks may be permitted.

In one embodiment there is provided data processing apparatus comprising: a chunk store containing specimen data chunks of previously processed data sets, a chunk index containing a chunk identifier for at least one of said specimen data chunks, a discrete manifest store, containing at least one manifest that represents a previously processed data set and that comprises at least one reference to at least one of said specimen data chunks, the processing apparatus being configured to divide input data to be processed into input data chunks; generate a chunk identifier for at least one of said input data chunks, identify a corresponding chunk identifier in the chunk index; and identify therefrom at least one of said manifests in the manifest store comprising at least one reference to a specimen data chunk identical to said input data chunk.

In one embodiment, there is provided a data compactor comprising: a chunk store configured for containing specimen data chunks, a discrete manifest store, configured for containing at least one manifest that represents a data set and that comprises at least one reference to at least one of said specimen data chunks, the compactor being configured to divide input data into input data chunks, select one of said input data chunks and identify at least one manifest having at least one reference to a specimen data chunk corresponding to the said selected input data chunk and to explore the at least one identified manifest for references to other specimen data chunks corresponding to other input data chunks of the data set.

A method of processing input data according to an embodiment will now be described. A method uses a chunk store 4 containing specimen data chunks 6; and a discrete manifest store 5, containing at least one manifest. In one embodiment, a method is performed using the data processing apparatus 3 described above. In one embodiment, the method is performed using a chunk store 4 and discrete manifest store 5 as described above.

Figure 6:
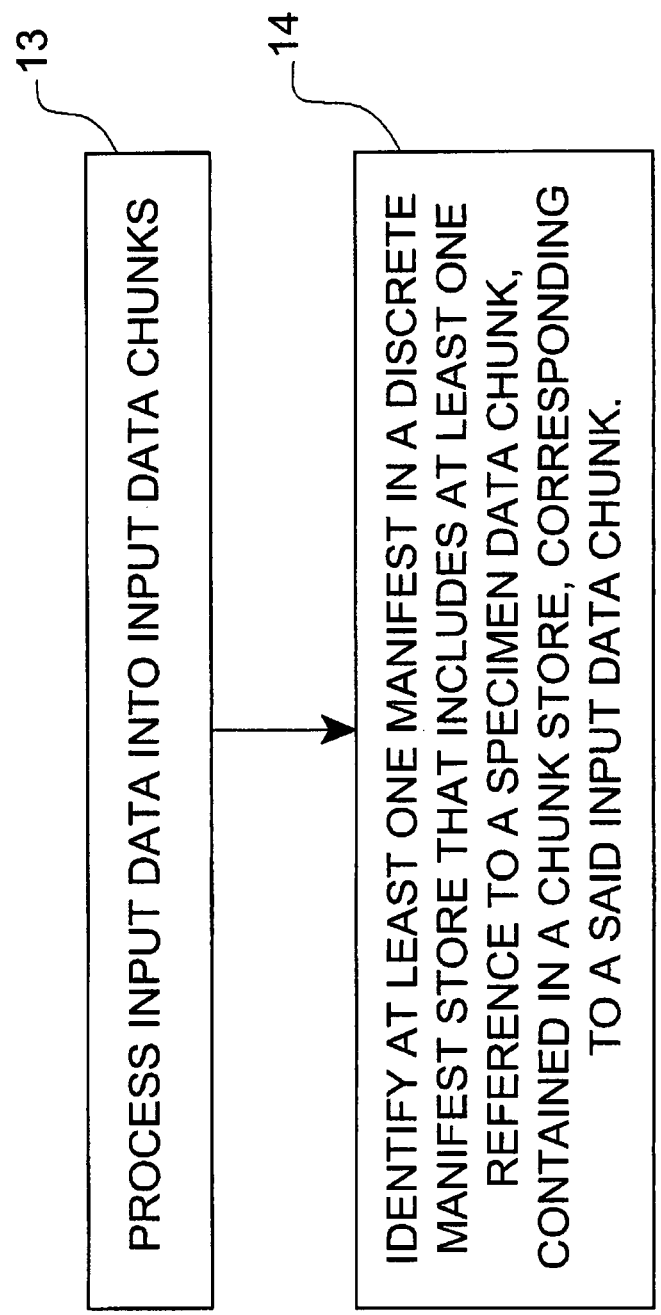
FIG. 6 shows a flow chart of a method according to an embodiment of the present invention.

A method, as shown in FIG. 6, comprises: processing 13 the input data into one or more input data chunks 2; and identifying 14 at least one manifest in the manifest store that includes at least one reference to a specimen data chunk 6 corresponding to at least one input data chunk.

In one embodiment, after dividing the input data 1 into one or more input data chunks 2, an input data chunk 2 is selected from the input data 1. The selection may be the first input data chunk 1 in the input data set 1, or it may be another selection. The selection of an input data chunk 2 from the divided input data set 1 may be random or pseudo-random.

A method according to an embodiment uses the selected input data chunk 2 to identify a manifest 7 already stored in the manifest store 5 which includes at least one reference to a specimen data chunk 6 corresponding to the selected input data chunk 2.

A method according to an embodiment is able to exploit the fact that each input data set 1 being processed may be similar. As such, previous similar manifests can be used to compile at least a part of a new manifest for the latest input data set.

When an at least one identified manifest has been processed and a specimen data chunk corresponding to a selected at least one input data chunk 2 identified, a reference to the specimen data chunk may be added to a manifest. As described above, the at least one identified manifests may further be analysed to identify references to specimen data chunks corresponding to other input data chunks 2 of the input data set 1. Should no more corresponding specimen data chunks be found, then the input data chunks 2 not yet identified as having a corresponding specimen data chunk existing in the chunk store 4 may be the subject of further operations. Accordingly, data processing apparatus 3 may then identify at least one manifest in the manifest store 5 which includes a reference to a specimen data chunk corresponding to the newly selected input data chunk 2. The procedure may be continued until all the unmatched input data chunks 2 have been processed by the data processor 3.

In one embodiment, a method comprises compiling a manifest representative of an input data set 1.

A method according to an embodiment comprises generating a chunk identifier of an input data chunk 2. The embodiment further comprises comparing the chunk identifier of the input data chunk 2 with the chunk identifiers stored in a chunk index 8, as described above.

One embodiment provides a method of processing input data, using: a chunk store containing specimen data chunks of previously processed data sets, a chunk index containing a chunk identifier for at least one of said specimen data chunks.

a discrete manifest store, containing at least one manifest that represents a previously processed data set and that comprises at least one reference to at least one of said specimen data chunks, the method comprising: dividing the input data into input data chunks; generating a chunk identifier for one of said input data chunks: and identifying a corresponding chunk identifier in said chunk index and identifying therefrom at least one manifest in said manifest database containing a reference to a specimen data chunk identical to said input data chunk.

When the chunk store 4 and manifest store 5 of an embodiment of the present invention are first provided, there will be no specimen data chunks 6 stored in the chunk store 4 and no manifests stored in the manifest store. Both the chunk store 4 and manifest store 5 are then populated. Thus, when processing a first input data set 1, each of the input data chunks 2 divided from the input data set 1 will be added to the chunk store 4 as specimen data chunks 6. A manifest will be compiled for the input data set 1 and added to the manifest store 5. FIG. 3 illustrates an example of an at least partially populated processor according to an embodiment. It will be appreciated that as more and more input data sets 1 are processed, the chunk store 4 and manifest store 5 will contain more specimen data chunks 6 and manifests respectively. There may reach a point where the majority of input data chunks 2 of input data sets to be processed correspond to specimen data chunks 6 already stored in the chunk store 4. In such a case, a manifest 6 may be compiled for the input data set, without any new additions being made to the chunk store 4, further demonstrating the advantages of methods according to some embodiments.

Figure 7:
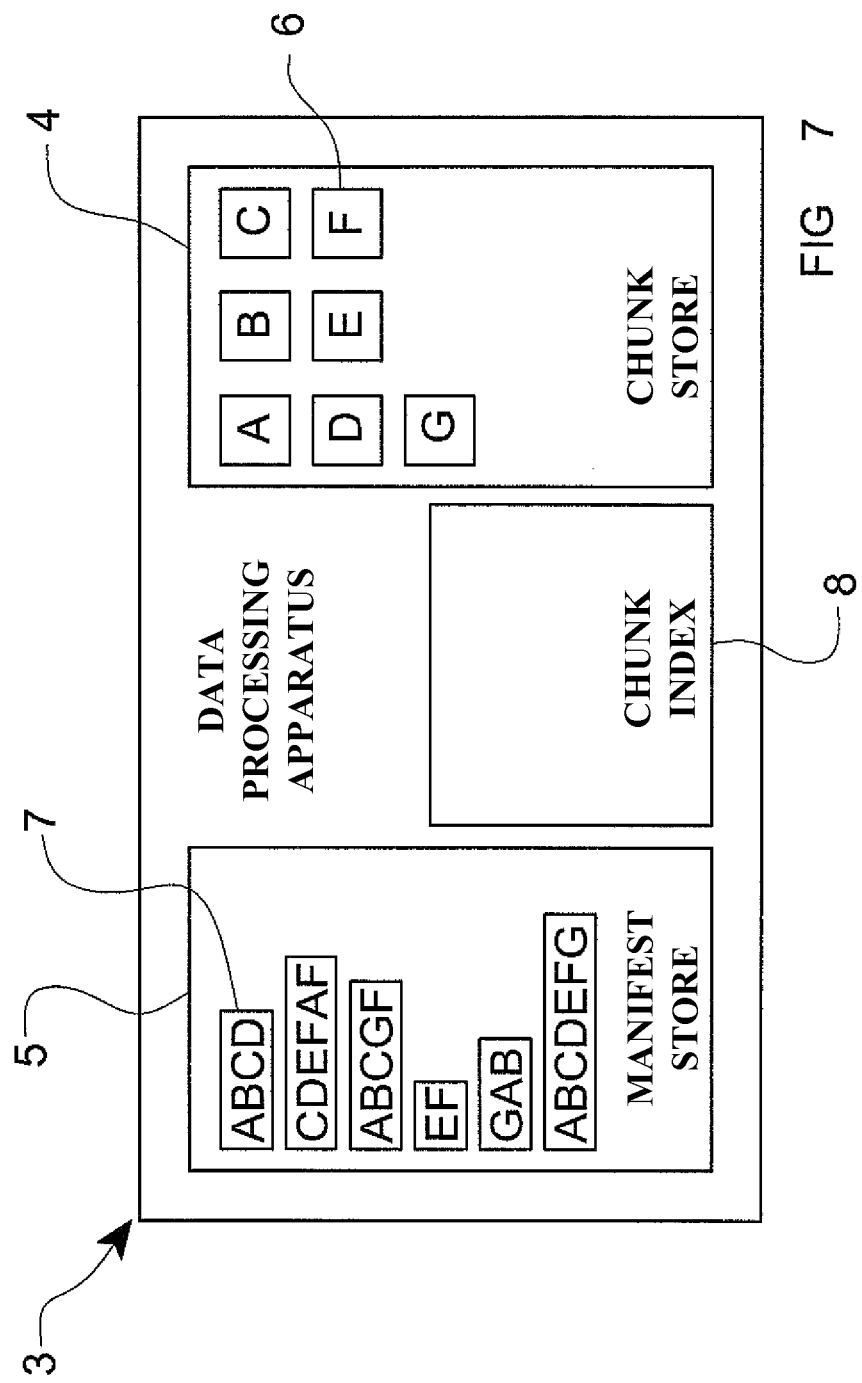
FIG. 7 shows a schematic representation of the data processing apparatus of FIG. 5 populated with a plurality of manifests and specimen data chunks.

FIG. 7 illustrates an embodiment of the data processing apparatus shown in FIG. 3 populated with a plurality of specimen data chunks 6 in the chunk store 4 and a plurality of manifests 7 in the manifest store 5.

The data processing apparatus 3 may form part of a data compaction, or de-duplication, management system. The data processing apparatus 3 may be integrated into a data storage system. A data processing apparatus 3 may be configured to operate 'actively', as data is sent to the data storage system for storage. Compaction may be performed in real time. Alternatively, data may be presented to the data processing apparatus 3 during 'off peak' periods. By off peak is meant periods where data may not be being presented to a data storage system for storage, and thus data processing apparatus 3 may process data already stored on the data storage system, to reduce any duplicated data already stored on the data storage system. Data processing apparatus may form part of a data housekeeping system of a data storage system.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A data processing apparatus comprising:
    a chunk store containing specimen data chunks of previously processed data sets,
    a chunk index containing a chunk identifier for at least one of said specimen data chunks,
    a discrete manifest store, containing at least one manifest that represents a corresponding one of the previously processed data sets and that comprises at least one reference to at least one of said specimen data chunks,
    at least one processor configured to:
        divide input data to be processed into input data chunks;
        generate a chunk identifier for at least a given one of said input data chunks;
        identify a chunk identifier in the chunk index corresponding to the generated chunk identifier; and
        identify, based on the identifying of the chunk identifier in the index corresponding to the generated chunk identifier, at least one manifest in the manifest store comprising at least one reference to a specimen data chunk identical to said given input data chunk.

2. The data processing apparatus according to claim 1, wherein the at least one processor is configured to further:
    analyze said identified at least one manifest to identify at least another reference in the identified at least one manifest to another of said specimen data chunks corresponding to another of the input data chunks.

* * * * *